United States Patent [19]
Kikuchi et al.

[11] Patent Number: 5,815,160
[45] Date of Patent: Sep. 29, 1998

[54] PRESENTATION SYSTEM FOR CORRECTING POSITIONAL AND SIZE INFORMATION OF IMAGES TO COMPENSATE FOR RESOLUTION OF DISPLAY APPARATUS

[75] Inventors: Tsuneyuki Kikuchi; Hiroaki Ueda, both of Tokyo, Japan

[73] Assignee: NEC Corporation, Tokyo, Japan

[21] Appl. No.: 626,390

[22] Filed: Mar. 29, 1996

[30] Foreign Application Priority Data

Mar. 29, 1995 [JP] Japan ................................ 7-071932

[51] Int. Cl.⁶ .................................................. G06T 3/00
[52] U.S. Cl. ............................................................. 345/439
[58] Field of Search ..................... 395/128, 139, 395/806, 807, 763, 787; 345/132, 127, 131, 142, 428, 433, 435, 438, 439, 348, 349, 350, 351, 302; 707/502, 525

[56] References Cited

U.S. PATENT DOCUMENTS 5,473,342  12/1995  Tse et al. ................................ 345/132

FOREIGN PATENT DOCUMENTS 2-38050  2/1990  Japan .
4-56890  2/1992  Japan .

OTHER PUBLICATIONS

Buchanan et al. "Automatic Temporal Layout Mechanisms" pp. 341–350, 1993.
Campbell–Grant "Introducing Oda", 1990.
Campbell–Grant et al. An Introduction to ISO DIS 8613, Office Document Architecture, and Its Application to Computer Graphics, 1987.

*Primary Examiner*—Almis R. Jankus
*Attorney, Agent, or Firm*—Foley & Lardner

[57] ABSTRACT

In order to provide a presentation system for displaying various kinds of media data simultaneously on a display device of any resolution, a scenario description file is prepared in the invention for storing information concerning media data to be presented.

A presentation system of the invention comprises an initial information table analyzing section and media information table analyzing section for analyzing the scenario description file, a layout correcting section for correcting positional information and sizes of display images of display media data described in the scenario description file, according to the resolution difference between the display device employed in editing the scenario description file and that for presentation, together with a font preparing section for correcting character sizes and character thicknesses, and a time description correcting section for correcting a reproduction time error caused by correcting the display sizes of the media data.

4 Claims, 15 Drawing Sheets

FIG. 2

INITIAL INFORMATION TABLE

| | PARAMETER NAME | | | | | | | | | |
|---|---|---|---|---|---|---|---|---|---|---|
| | (SCENE COMPOSITION) | | | | | (EDITING ENVIRONMENT) | | | | |
| | SCENARIO NAME | SCENE NAME | MEDIA TYPE | MEDIA NAME | START TIME | END TIME | RESOLUTION | POSITION | SIZE | ADDITIONAL INFORMATION |
| PARAMETER | pre_1 | Start | Video | Vf_1 | 00:00:00 | 00:02:00 | 640,480 | 120,100 | 320,240 | — |
| | — | — | — | Vf_2 | 00:02:00 | 00:10:00 | — | 130,110 | 300,220 | — |
| | — | — | Audio | Af_1 | 00:00:00 | 00:10:00 | — | — | — | — |
| | — | — | Text | Tf_1 | 00:00:00 | 00:10:00 | — | 10,10 | 200,10 | — |
| | — | — | Text | Tf_2 | 00:02:00 | 00:10:00 | — | 10,360 | 620,110 | — |
| | — | Next | Video | Vf_3 | 00:00:00 | 00:20:00 | 1024,768 | 0,0 | 1024,768 | NO FRAME |
| | — | — | Audio | Af_2 | 00:00:00 | 00:20:00 | — | — | — | — |

FIG. 3

MEDIA INFORMATION TABLE

| | | PARAMETER NAME | | | | |
|---|---|---|---|---|---|---|
| | MEDIA TYPE | MEDIA NAME | RESOLUTION | SIZE | TIME STAMP | RECORDED DEVICE |
| PARAMETER | Video | Vf_1 | 640,480 | 320,240 | 12.01.95 | HDD1 |
| | — | Vf_2 | 640,480 | 300,220 | 04.10.95 | CD_ROM |
| | — | Vf_3 | 1024,768 | 1024,768 | 29.02.96 | CD_ROM |
| | — | · · | · · | · · | · · | · · |
| | Audio | Af_1 | — | — | 04.10.95 | HDD1 |
| | — | · · | — | — | · · | · · |
| | Text | Tf_1 | 640,480 | 200,10 | 30.01.96 | HDD2 |

FIG.4A

```
         21        22       23                    23
      ⌢⎴⎴⎴⎴⎴     ⌢            ⌢                    ⌢
...... \textHight{10}Ten Pt <\textHight{5}Five Pt>
Ten Pt again ......
```

FIG.4B

...... Ten Pt Five Pt
Ten Pt again ......

PRESENTATION SYSTEM FOR CORRECTING POSITIONAL AND SIZE INFORMATION OF IMAGES TO COMPENSATE FOR RESOLUTION OF DISPLAY APPARATUS

BACKGROUND OF THE INVENTION

This invention relates to a presentation system, and more particularly to a presentation system for presenting, simultaneously on a screen, various kinds of media data such as video pictures, still pictures, audio data, text data, graphic data or the like.

In conventional presentation systems, there is used a device wherein, in order to deepen listeners' understanding, a manuscript drawn with characters and figures representing the essentials of an explanation is copied to a transparent film to be projected with an optical method, or a system wherein the manuscript for presentation is videotaped by a video camera to be displayed on a TV monitor, for example.

In these systems, however, a manuscript for presentation must be manually prepared, so that much time and labor have been required for preparing the manuscript. Moreover, pieces of a manuscript must be exchanged by a presenter or an operator, so that it has been difficult to carry out a smooth presentation.

Recently, there has been proposed a presentation system which displays a manuscript prepared in desired order making use of computer function for displaying video images and textual data, in place of the conventional systems as described above.

As an example, there is a system disclosed in a Japanese patent application laid open as a Provisional publication No. 56890/1992 dated Feb. 24, 1992. In the system, image data are outputted onto a display unit in accordance with a scenario wherein a procedure for displaying a manuscript is described.

FIG. 15 is a block diagram showing a construction of a conventional presentation system wherein reference numeral;

31 designates a file recording section, 32 and 33 designate a natural picture displaying memory and a text and graphic picture displaying memory, each of them storing temporarily a variety of media data to be displayed, 34 is a video image outputting section for selecting and processing image data for presentation stored in the respective displaying memories for displaying, 35 is a display unit for displaying image data selected and processed by the video image outputting section 34, 36 is a displaying picture control section for controlling image processing, displaying processing and the like of the data stored in the natural picture displaying memory 32 and the text and graphic picture displaying memory 33 through the video image outputting section 34, 37 is a scenario editing section for affecting magnification or reduction control of displaying image and preparing scenario data, 38 is an instruction inputting section for inputting operator's instructions, 39 is a scenario performing section for controlling the scenario performance in accordance with the operator's instructions inputted through the instruction inputting section 38, 40 is a CPU for controlling the whole system, and 41 is a system memory for the system, respectively.

FIG. 16 illustrates a format of scenario data in the conventional presentation system. In a file management information region of the senario data, there are stored scenario information data of each page comprising displaying file names to be reproduced and a switching method of the page in accordance with operator's instruction, and display image information data of each displaying file such as a data attribute, a displaying area and the like. Thus, reproduction of the manuscript is carried out in response to page information from the operator, referring to the above-mentioned file management region when the manuscript is presented.

There is also a system disclosed in a Japanese patent application laid open as a provisional publication No. 38050/1990, wherein presentation images are displayed in a display device with a desired layout. In the system, developing positions and sizes of the presentation images to be developed on the display device are inputted through an instruction inputting means for processing necessary magnification or reduction of the image data read out from a storage medium for displaying them with a desired layout.

In the conventional presentation systems as mentioned above, it is possible to record textual and graphic data, video pictures and still pictures in files and to present them according to a scenario data storing displaying information. However, resolution of the display device has not been emphasized in these systems.

FIGS. 17A and 17B illustrate an example of a resolution difference between display devices. FIG. 17A shows the case of 640×480 pixel resolution while FIG. 17B shows the case of 1024×768 pixel resolution.

When a manuscript prepared with a display device of 640×480 pixels is presented, for example, on a display device of 1024×768 pixels, according to the file management information of FIG. 16, the size of the presented image is reduced as shown by FIG. 17B, resulting a poor presentation.

This is a problem.

SUMMARY OF THE INVENTION

Therefore, a primary object of the present invention is to provide an effective presentation system for presenting, simultaneously on a screen, various kinds of media data such as video pictures, still pictures, audio data, text data, graphic data or the like, which can reproduce image data on a display device of any resolution in synchronous with changes in time in accordance with scenario data, correcting positions and sizes of image data to be displayed with a similar geometrical relationship to the screen size of the display device employed for editing the scenario data.

In order to achieve the object, a presentation system of the present invention having a file recording section for recording a variety of media data for presentation and scenario data specifying a presentation procedure of a manuscript for presentation, a text RAM and a graphic RAM for storing temporarily display media data designated by the scenario data among the variety of media data for displaying on a display device for presentation, a scenario editing section for preparing the scenario data and controlling screen display of the display media data, an instruction inputting section for inputting instructions for preparing the scenario data and reproducing a presentation, and a scenario performing section for controlling reproduction of the presentation according to the scenario data and the instructions; comprises:

a layout correcting section controlled by the scenario performing section for correcting positional information and sizes of display images of the display media data according to resolution of the display device for presentation, the positional information and the sizes being prepared and described in the scenario data according to resolution of a display device employed for preparing the scenario data.

And, the presentation system of the present invention further comprises a font preparing section controlled by the scenario performing section for correcting character sizes and character thicknesses to be displayed on the display device for presentation according to resolution of the display device for presentation, the character sizes and the character thicknesses being prepared according to resolution of the display device employed for preparing the scenario data.

Therefore, in the present invention, an effective presentation system which can reproduce image data in an appropriate layout on a display device of any resolution is materialized.

Still further, the presentation system of the invention comprises a time description correcting section controlled by the scenario performing section for correcting a reproduction time error of the display media data caused by correcting the positional information and the sizes of display images of the display media data.

So, with the presentation system of the invention, various kinds of media data can be presented synchronized with each other simultaneously on a screen of a display device of any resolution.

BRIEF DESCRIPTION OF THE DRAWINGS

The foregoing, further objects, features, and advantages of this invention will become apparent from a consideration of the following description, the appended claims, and the accompanying drawings in which the same numerals indicate the same or the corresponding parts.

FIG. 2 illustrates an example of an initial information table 2 of FIG. 1.

FIG. 3 illustrates an example of a media information table 3 of FIG. 1.

FIG. 4A illustrates an example of text data with font commands and block separators inserted therein.

FIG. 4B shows a displayed image of the text data of FIG. 4A.

DETAILED DESCRIPTION OF THE PREFERRED EMBODIMENT

Now, an embodiment of the present invention will be described in detail hereinbelow in conjunction with the accompanying drawings.

Figure 1:
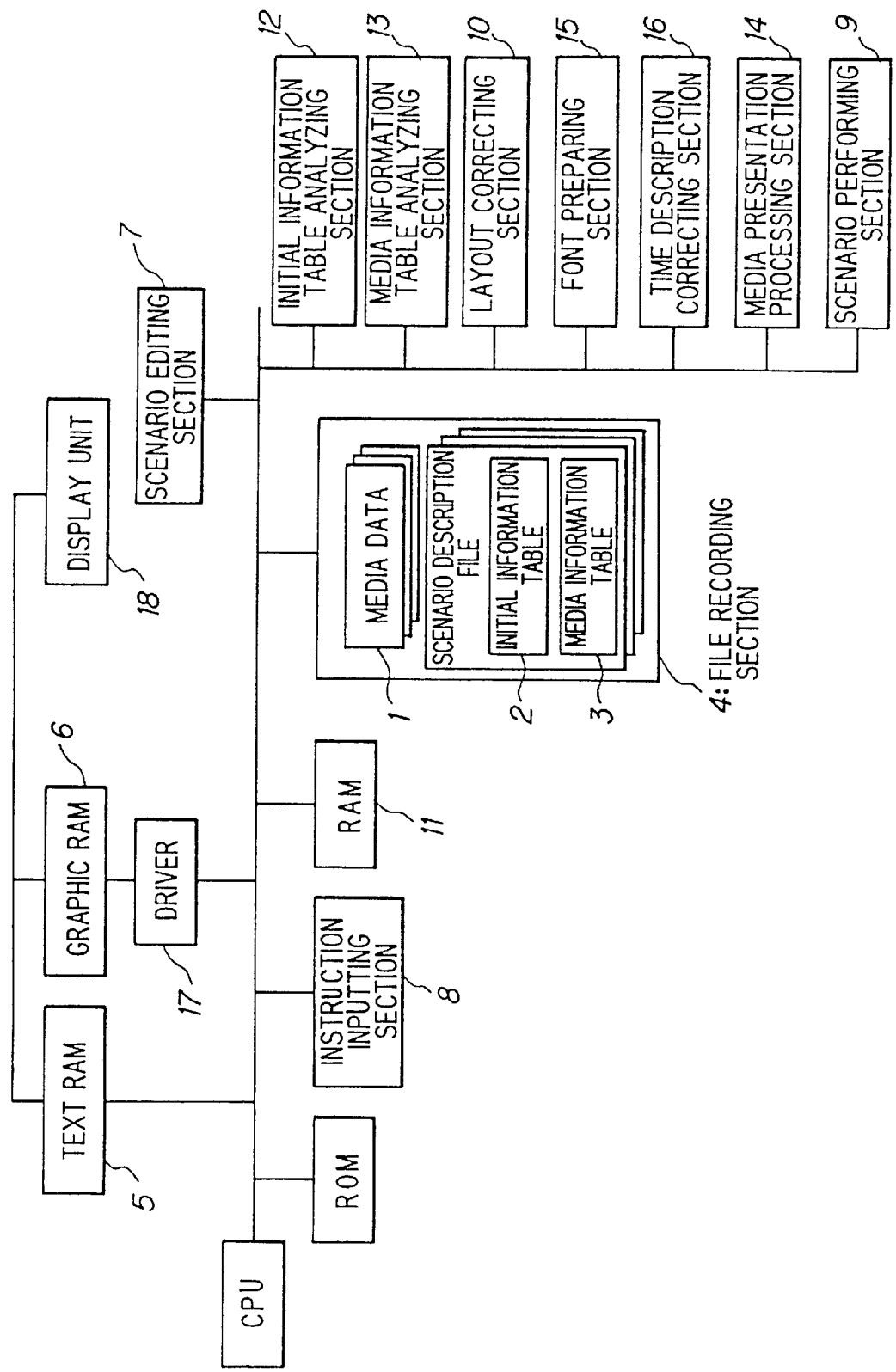
FIG. 1 is a block diagram illustrating an embodiment of the present invention.

FIG. 1 is a block diagram illustrating an embodiment of the present invention.

As shown in FIG. 1, the presentation system of the embodiment comprises:

- a file recording section 4 for storing a plurality of media data 1 for presentation, and scenario description files specifying a displaying procedure of a manuscript for presentation, consisting of an initial information table 2 onto which are described information required for retrieving, loading and presenting each of the media data 1 to be displayed in the manuscript and an environment of the hardware when the media data 1 to be displayed are prepared, and a media information table 3 onto which are described additional information of the media data 1 to be displayed;
- a text RAM 5 and a graphic RAM 6 for temporarily storing the media data 1 to be displayed;
- a scenario editing section 7 for preparing the scenario description files and controlling screen display of the media data 1 to be displayed such as image data, audio data, text data, etc. for presentation;
- an instruction inputting section 8 for inputting editing commands and presentation instructions;
- a scenario performing section 9 for performing a presentation according to a scenario description file analyzed;
- a layout correcting section 10 for correcting positional information and sizes of display images of the media data 1, described in the scenario description file according to resolution of a display device employed when they are edited, in accordance with resolution of a display used for reproduction controlled by the scenario performing section 9;
- a RAM 11 for reading and storing the media data 1, the initial information table 2, and the media information table 3 of a manuscript for presentation from the file recording section 4;
- an initial information table analyzing section 12 for analyzing the contents of the initial information table 2 stored in the RAM 11;
- a media information table analyzing section 13 for analyzing the contents of the media information table 3 read out into the RAM 11;
- a media presentation processing section 14 for presenting the media data 1 to be displayed;

a font preparing section 15 for correcting font data contained in text data and preparing font data for displaying characters of the text data;

a time description correcting section 16 for correcting a reproduction time error caused by correcting sizes of the display images of the media data 1 to be displayed;

a driver 17 for transferring image data of the media data 1 to be displayed to the graphic RAM 6 in accordance with the instruction from the layout correcting section 10; and a display device 18 for displaying the image data.

Format examples of the initial information table 2 and the media information table 3 of the scenario description file stored in the file recording section 4 are shown in FIGS. 2 and 3 and an example of a text data among the media data 1 are shown in FIG. 4, and parameters used therein will be briefly described.

FIG. 2 illustrates an example of the initial information table 2.

In the initial information table 2, there are described parameters representing scene composition such as a senario name unique to a manuscript for presentation, scene names (each of the scenes defines a relation of media data 1 to be presented simultaneously or consecutively in the scene), media types, media names to be presented in the scene, and start and end times of each media data to be presented, and parameters representing editing environment such as resolution of display devices used in editing, positions, sizes, and other additional information with which applications or the media data 1 are to be displayed.

FIG. 3 is a format diagram illustrating a part of a media information table, wherein are described parameters for each media data such as a madia type, a media name, resolution prepared, displaying size, a time stamp, a type of recorded device, presence or not of frame enclosing the media image, thicknesses of the frame, color of the frame, archive file name in case archived, retrieving command of the archive file, etc.

FIGS. 4A and 4B illustrate an example of the text data containing font data and the text data displayed on a screen, respectively.

In the present invention, text data contain font data composed of a command 21 of a string beginning with '\' and its parameter 22 in braces {} following the command 21. The command 21 is an identifier of the parameter 22 designating attributes of characters following it such as font name, font height, font width, font slant, angle between base line and X-axis, font thickness, underline attribute, cancel line attribute, character color, background color, etc. When the font preparing section 15 finds the identifier '\', it prepares fonts designated by the parameter 22 in the braces {}. Furthermore, characters '<' and '>' called block separators 23 are inserted for specifying a block in which effect of the command 21 is limited.

Now, operation of the presentation system of the embodiment is described.

Figure 5:
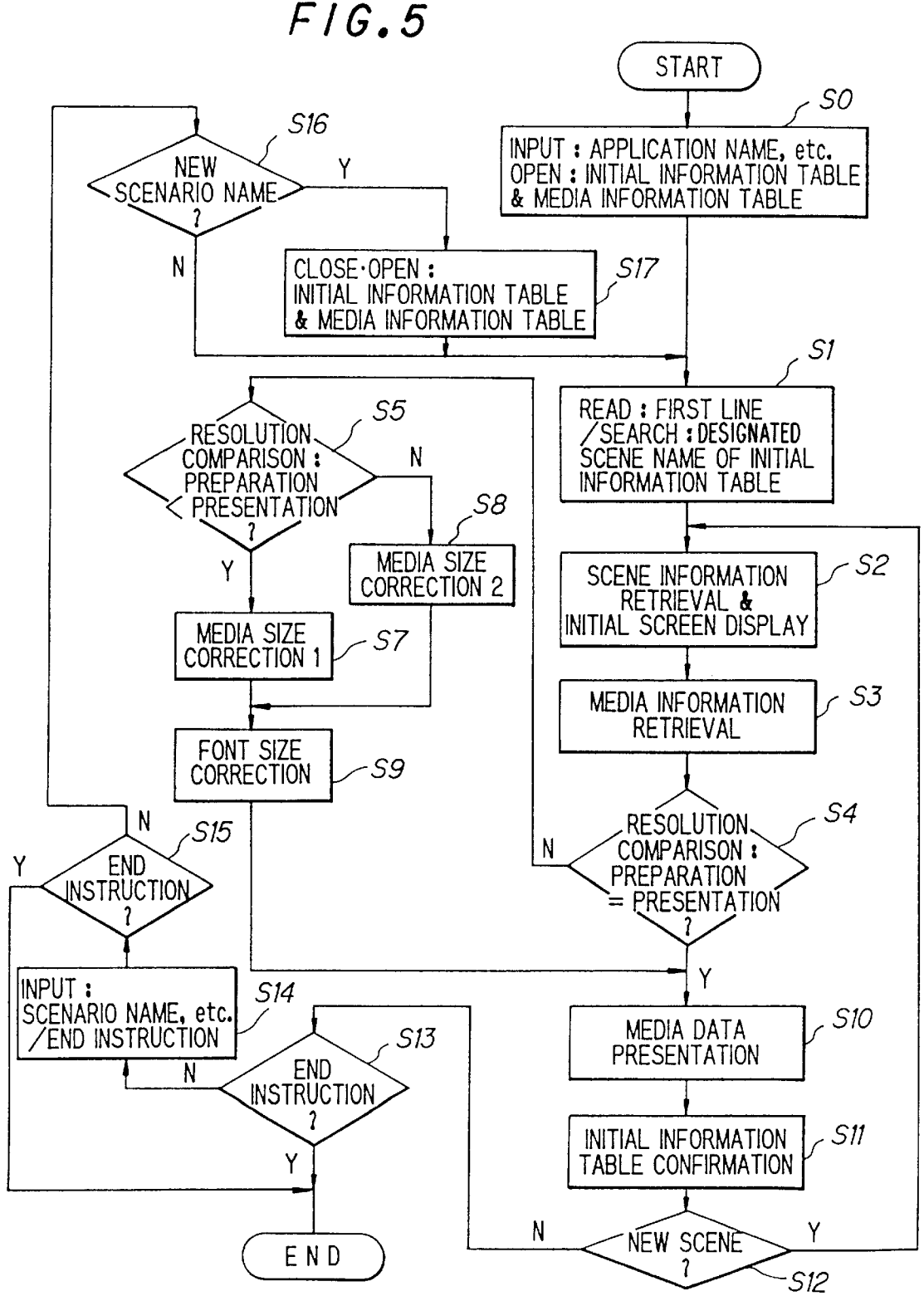
FIG. 5 is a flowchart of control of the embodiment for conducting a presentation.

FIG. 5 is a flowchart of control executed in the embodiment for conducting a presentation. When a presentation is performed, the scenario performing section 9 plays a main module and controls the layout correcting section 10, the initial information table analyzing section 12, the media information table analyzing section 13, the media presentation processing section 14, the font preparing section 15, and the time description correcting section 16, for presenting media data 1 in accordance with resolution of the display device 18.

For performing a presentation, an application name is inputted in step (hereafter abbreviated to S) 0, together with a scenario name to be presented and a scene name to be displayed at first, for opening initial information table 2 and media information table 3 of a desired scenario description file. When the scenario name or the scene name is omitted, a first found scenario description file or a first described scene name is adopted as the respective default name.

In S1, the designated scene name is searched, or a first line is read out when no scene name is designated, from the initial information table 2. Then in S2, for acquiring information concerning the scene, all the parameters for the scene in the initial information table 2 are retrieved and stored in a predetermined region of the RAM 11, and the designated application is displayed after its displaying size is adjusted. In S3, information relating to media data 1 designated in the initial information table 2 is acquired from the media information table 3.

Then, it is discriminated in S4 whether the resolution of the display device 18 for presentation is equal or not equal to that of the display device employed at the time of editing. If it is not equal, whether the resolution of the display device in editing is higher or not than that of the display device 18 is descriminated in S5. In case higher, media size indication and font size indication described in the parameters are corrected in S7 and S9, while they are corrected in S8 and S9 if lower, before the presentation instruction is dispatched in S10. When both display devices have the same resolution, the control transfers directly from S4 to S10.

Thus the designated media data 1 are presented on the display device 18.

Then, in S11, the initial information table 2 is referred to again for discriminating in S12 whether another scene is to be presented. In case there is another scene, the control returns to S2 for repeating the same processes. If there is no request for a new scene, it is confirmed in S13 whether there is a description for a termination in the scenario or not. In case there is no description for termination, the control waits a user's instruction in S14. In case there is found a description for termination in S13 or an indication for termination from a user in S15, the presentation processes are terminated. When a new scenario name and/or a new scene name is inputted in S16, control returns to S1. In case a new scenario name is indicated, the current initial information table 2 and the current media information table 3 are closed for opening those corresponding to the new scenario name through S17.

In the following paragraphs, operation in S2 of FIG. 5 of the initial information table analyzing section 12 of FIG. 1, which analyzes the contents of the initial information table 2, will be described.

In the initial information table 2, various parameters of each media data are written in each line as illustrated in FIG. 2. Here in the file, parameters concerning media data identified by a media name are written consecutively separated by a character ';', in a line record ending with a return code. And each parameter is expressed as "parameter name= parameter value". As for the parameters representing scenario name, scene name and media type, they are omitted when they are the same with the preceding line as shown in FIG. 2. And unnecessary parameters for the media data are omitted, so that the parameter representing the resolution (of the display device employed in editing) is written only in lines having scene name parameter, namely each beginning line of table data concerning a scene, for example.

Figure 6:
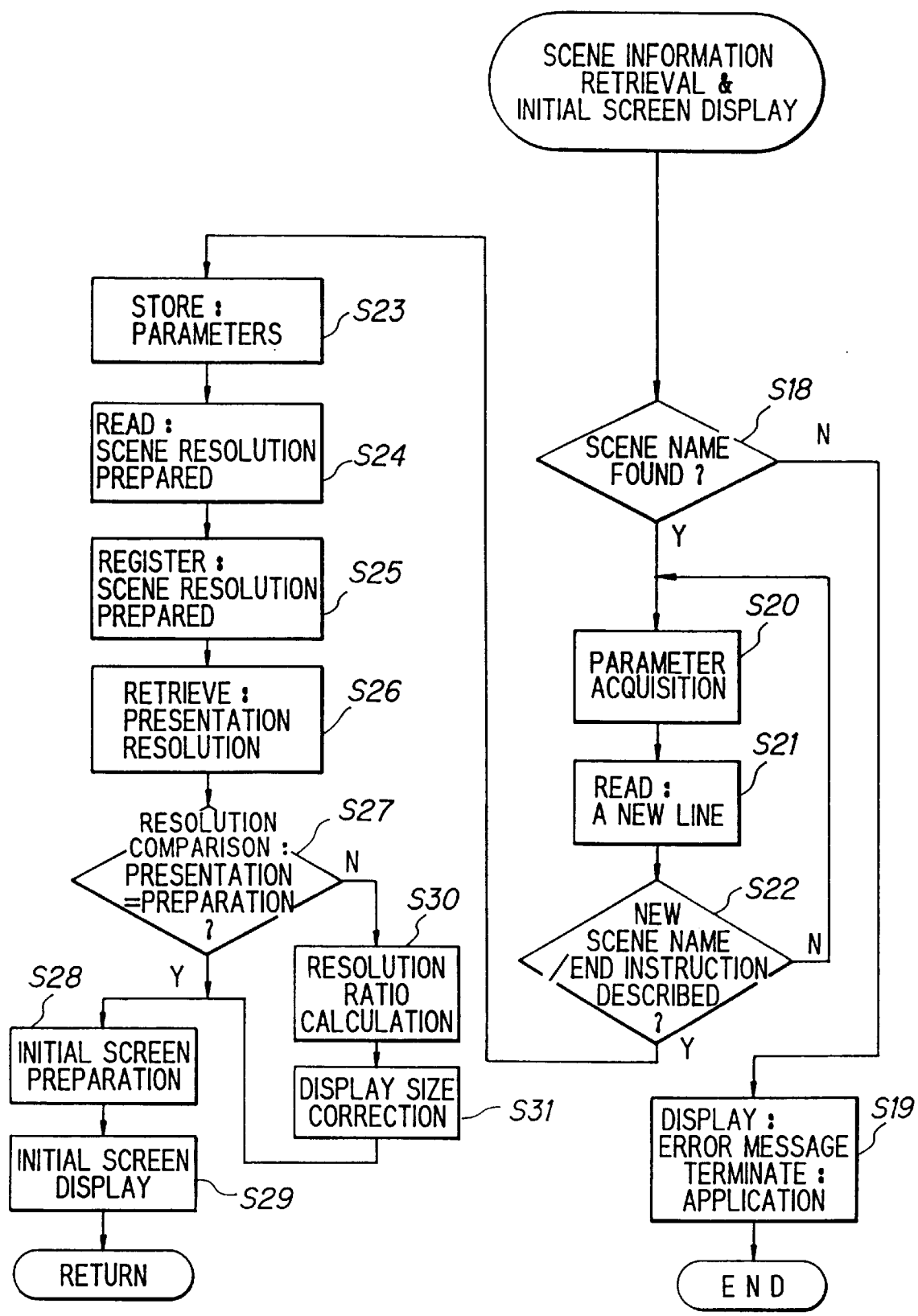
FIG. 6 is a flowchart showing control in the initial information table analyzing section 12 of FIG. 1.

FIG. 6 is a flowchart showing control in the initial information table analyzing section 12.

In S18 following S2 of FIG. 5, scene name is confirmed. In case there is no scene name described in the first line or the designated scene name is not found in the initial information table 2, an error message is displayed and the application is terminated in S19. Otherwise, parameters in the line are acquired in S20, and a new line is read out in S21. When there is no scene name parameter in the line, the line is considered having parameters of new media data of the same scene and control returns to S20 for acquiring them. Steps S20 to S22 are repeated until a new scene name parameter is found in a line in S22.

When a scene name parameter is found in S22, all parameters of a scene acquired in S20 are registered in a predetermined region of the RAM 11 in S23. Then in S24, information relating to the starting scene of the application, namely the resolution of the display device employed when the scene was prepared for example, is read out from the RAM 11 in S24 to be registered in S25 and compared in S27 with resolution of the display device 18 for presentation retrieved in S26.

When the result is equal, a screen is prepared in S28 in accordance with the display position, size and form for the application for presenting an initial scene of the application in S29. When the resolution differs with each other, a resolution ratio of the present display device 18 to that of the display device at the time of editing is calculated in S30, and the display position and size are corrected in S31 according to the resolution ratio for processing in S28 and S29.

Now, control in S3 of FIG. 5 in the media information table analyzing section 13 is described in the same manner.

Figure 7:
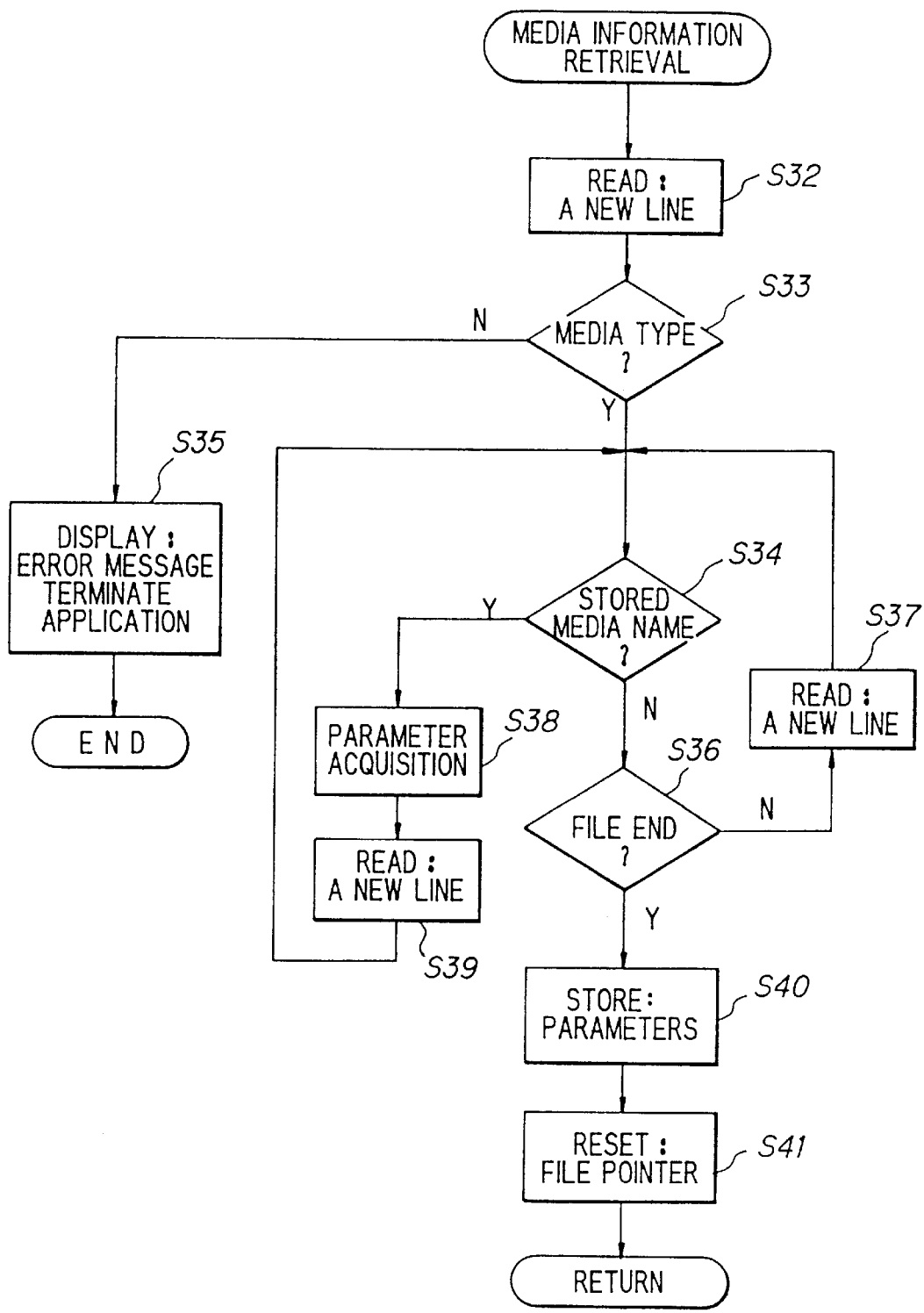
FIG. 7 is a flowchart illustrating control in the media information table analyzing section 13 of FIG. 1.

FIG. 7 is a flowchart illustrating control in the media information table analyzing section 13, which is started up by the scenario performing section 9. The scenario performing section 9 acquires information relating to the media data 1 to be displayed in a scene from the media information table 3. The media information table analyzing section 13 reads out a first line of the media information table 3 in S32 for confirming in S33 if a media type is described in the line or not. If there is described no media type parameter in the first line, control transfers to S35 for displaying an error massage and terminating the application.

After a media type parameter is confirmed in S33, parameters described in each line having a media name parameter corresponding to one of the media names registered in the RAM 11 in S23 of FIG. 6 are acquired through S38 and S39 until the file end, checking media name parameter of each line in S34 and passing unnecessary lines through S37. When the file end is found in S36, control transfers to S40 for registering acquired parameters into another predetermined region of the RAM 11 and the control returns to S4 of FIG. 5 after the file pointer is reset in S41 for a next media information retrieval of another scene.

Now, operation of the layout correcting section 10 in S7 or S8 of FIG. 5 for correcting scene layout and media sizes according to the resolution of the display device 18 will be described.

Figure 8:
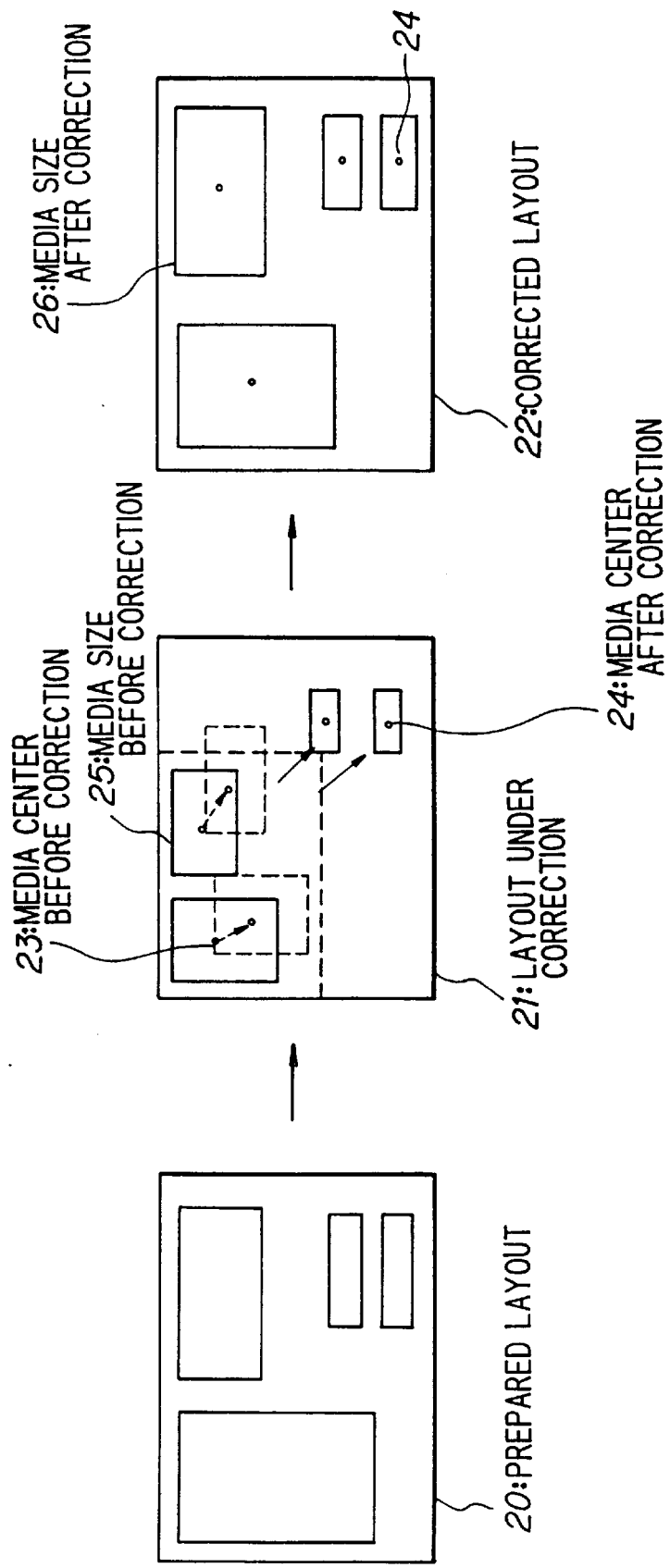
FIG. 8 illustrates transition of conceptional layouts of a scene corrected in S7 for adjusting to a display device 18 having higher resolution than that of the display device employed when the scene is prepared.
Figure 9:
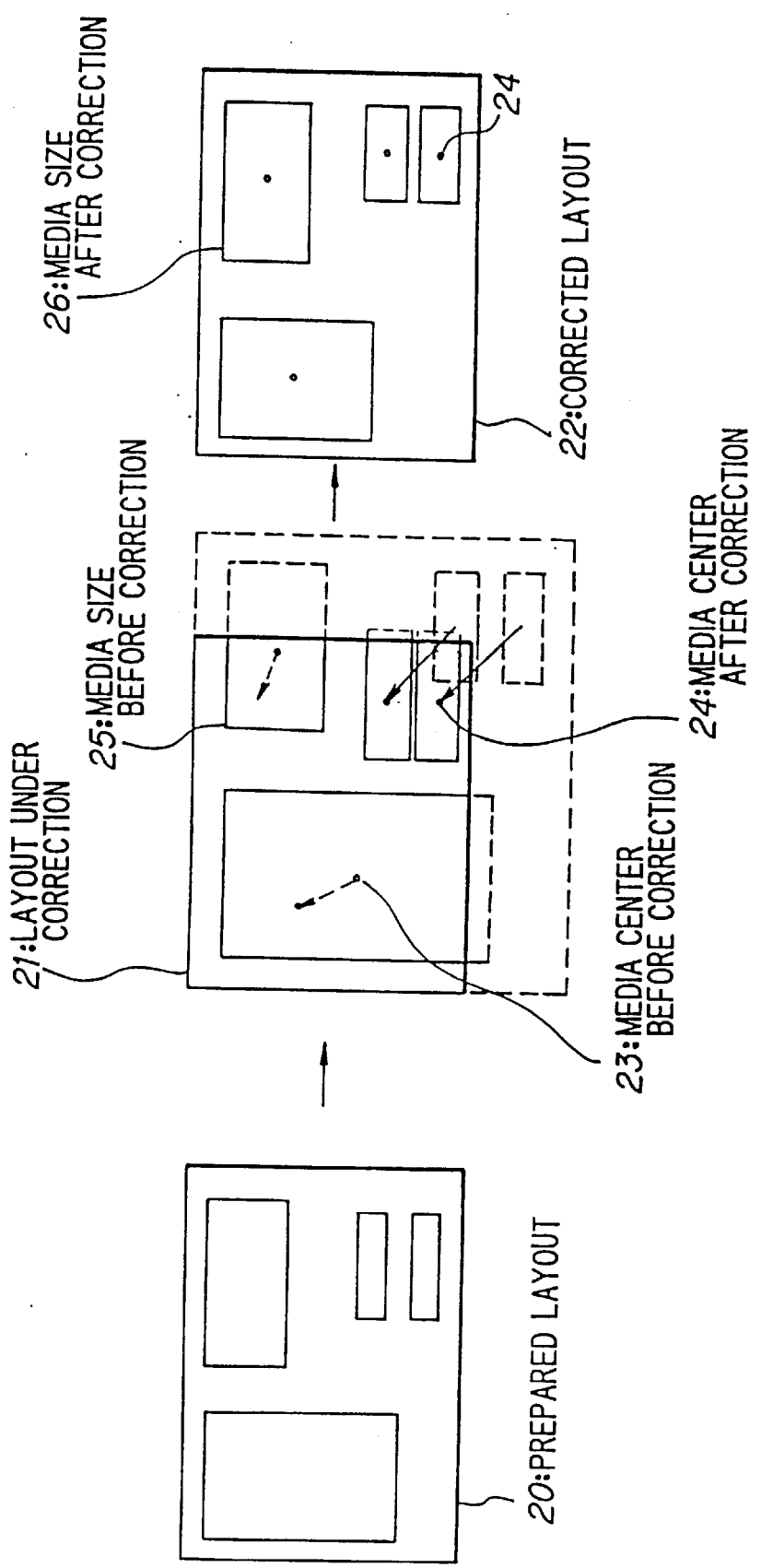
FIG. 9 illustrates transition of conceptional layouts of the scene corrected in S8 for adjusting to a display device 18 having lower resolution than that of the display device employed when the scene is prepared.

FIG. 8 illustrates transition of conceptional layouts of a scene corrected in S7 for adjusting to a display device 18 having higher resolution than that of the display device employed when the scene is prepared, while FIG. 9 illustrating corresponding layout transition corrected in S8 for adjusting to a display device 18 having lower resolution.

Figure 10:
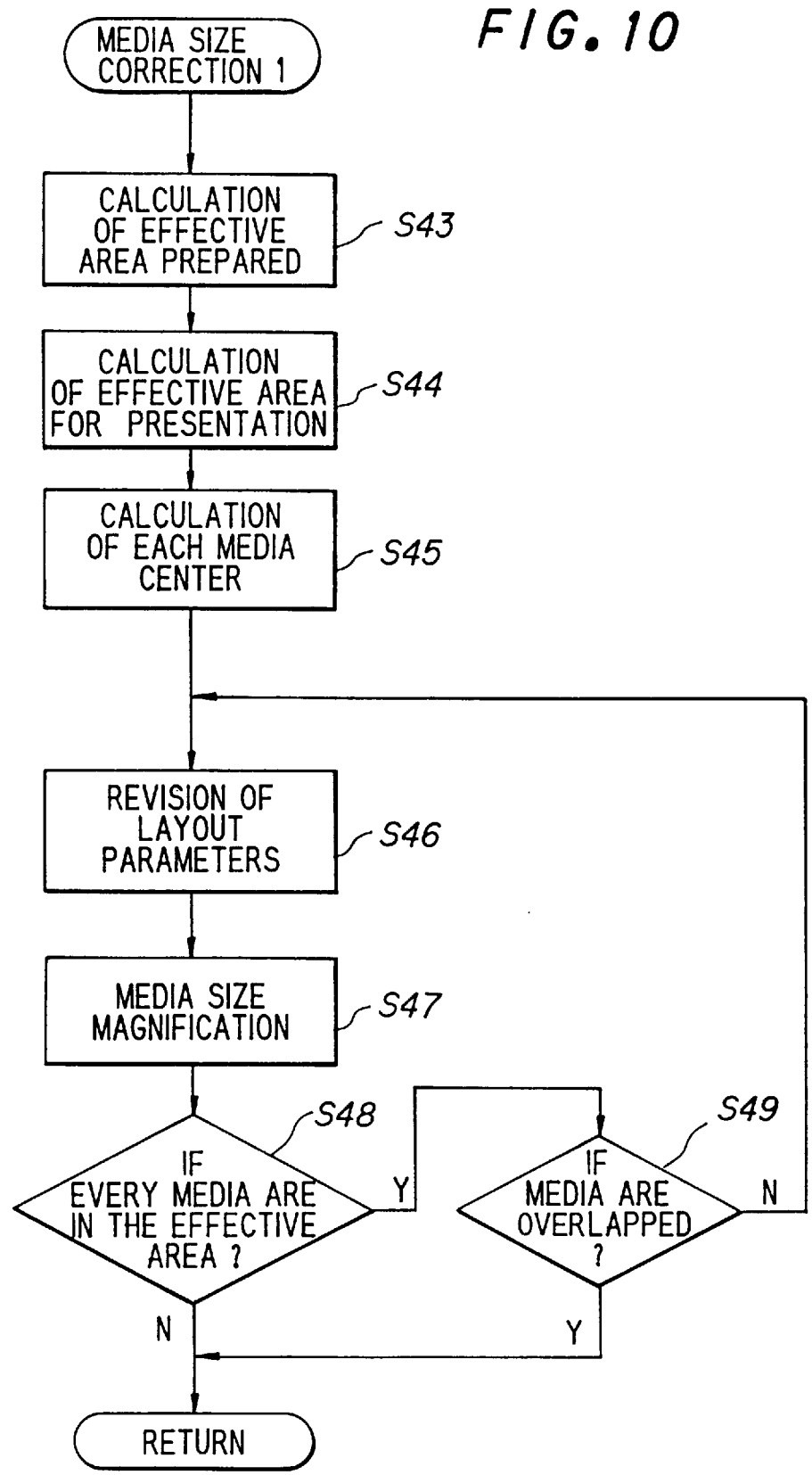
FIG. 10 is a flowchart illustrating control in the layout correcting section 10 in S7 of FIG. 5.
Figure 11:
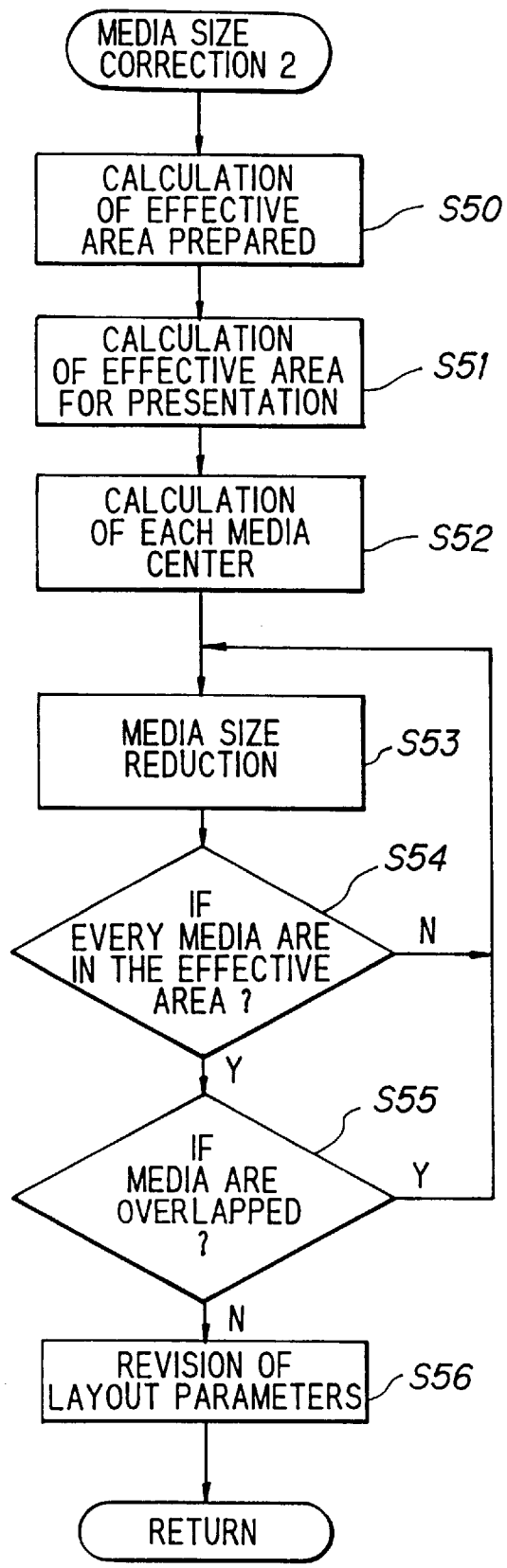
FIG. 11 is a flowchart illustrating control in the layout correcting section 10 in S8 of FIG. 5.

FIG. 10 is a flowchart illustrating control in the layout correcting section 10 in S7 of FIG. 5, while FIG. 11 illustrating corresponding control in S8.

In FIGS. 8 and 9, reference numeral 20 designates a layout indicated by layout parameters described in the initial information table 2, 21 designates a layout represented by layout parameters partially corrected and 22 designates a layout represented by layout parameters after corrected, here layout parameters mean the position parameters and size parameters for each media data to be displayed in the scene.

Figure 17A:
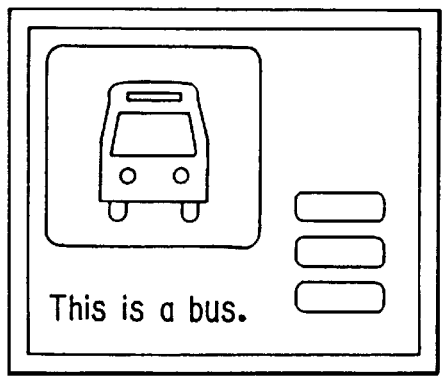
FIG. 17A illustrates a scene displayed on a display device having same resolution with that of display device emproyed for editing.
Figure 17B:
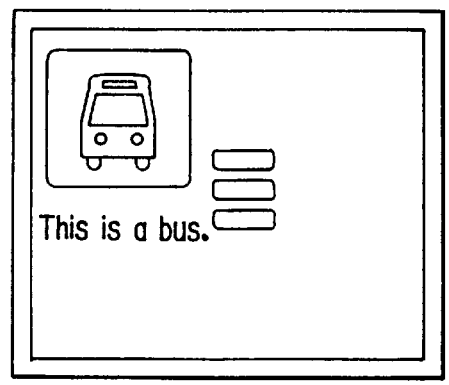
FIG. 17B illustrates a scene displayed on a display device having higher resolution than that of display device emproyed for editing.

When resolution of the display device 18 for presentation is higer than that of the display device employed in editing a scene, the scene without correction is displayed with its size reduced on the upper left of the display screen as described in connection with FIG. 17A and FIG. 17B.

Therefore, in S43 and S44 of FIG. 10, the size ratio of the effective area of the display device 18 to the effective area of the scene prepared is calculated, taken into consideration the difference of aspect ratio between them in case it differs with each other. According to the size ratio calculated, the position parameter for each media data, namely, the coordinates of the position for each media to be displayed, is calculated in S45 and corresponding values stored in the RAM 11 are revised in S46.

Then, the size parameters for each media data are magnified in S47 with a coefficient determined by performance of the driver 17. This is done in a step by step fashion, for revising corresponding layout parameters in S46 with the conditions checked in S48 and S49 that the displayed media do not overlap; in the effective area of the display device 18.

Thus, most appropriate values of layout parameters for media data 1 can be stored in the RAM 11.

When resolution of the display device 18 is lower than that of the display device employed in editing the scene, media size correction 2 in S8 of FIG. 5 is performed following the flowchart of FIG. 11 as illustrated in FIG. 9, in a similar way to S7 above described. The description is thus omitted for simplicity.

Figure 12:
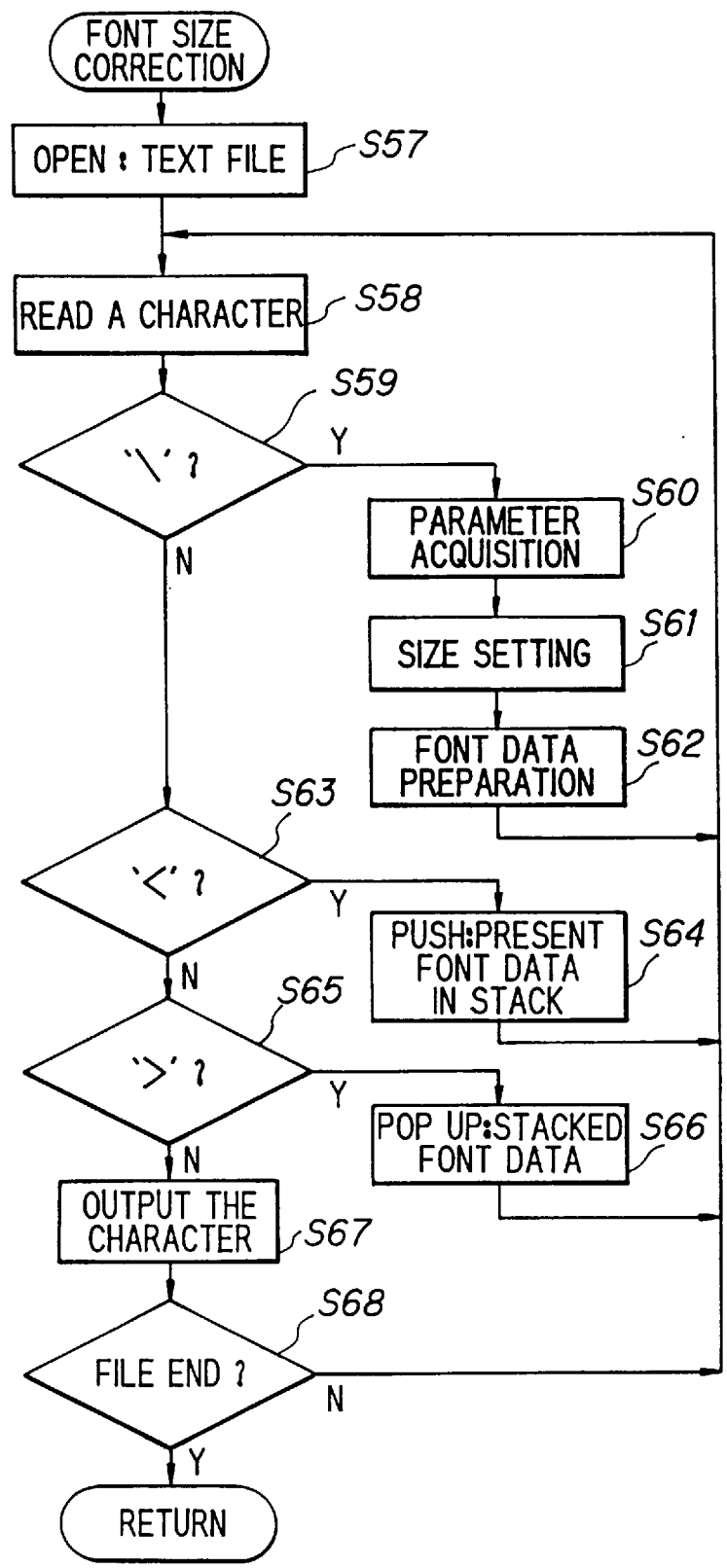
FIG. 12 is a flowchart illustrating control in the font preparing section 15.

Next, operation of the font preparing section 15 in S9 of FIG. 5 for correcting text data prepared for a scene of a resolution according to the resolution of the display device 18 is described referring to a flowchart shown in FIG. 12.

Position and size of area to be displayed of text data are corrected in the same way with other media data in S8 or S9. In S9, font data such as hight, width and thickness of characters for displaying are revised.

In S57, a text file designated by a scenario performing section 9 is opened for reading one character by one character in S58 from the top of the file. The read out character is verified if it is a command identifyer '\' or an opening or closing block separators '<' or '>' in S59, S63 and S67 respectively. In case it is the command identifyer '\', control goes to S60 for acquiring a command string and its parameter following the command identifyer '\', setting character size in S61 and preparing font data in S62 according to the parameter before returning to S58 for reading a following character. In case it is the opening block separator '<', current font data are pushed in a stack in S64 and control returns to S58. In case it is the closing block separator '>', the stacked font data are popped up in S66 for reproducing font environment before the opening block separator '<', and the control returns to S58.

Otherwise, the read out character is outputted to the driver 17 in S67 for developing a bit map for the character in the graphic RAM 6 of FIG. 1 according to current font data.

Thus, steps S58 to S68 are repeated until file end is detected in S68 for displaying text data in the text file.

When usage of bild-in fonts is designated by a parameter, the text data are output directly to the text RAM 5 of FIG. 1.

Now, operation of the time description correcting section 16 of FIG. 1 is described.

Figure 13:
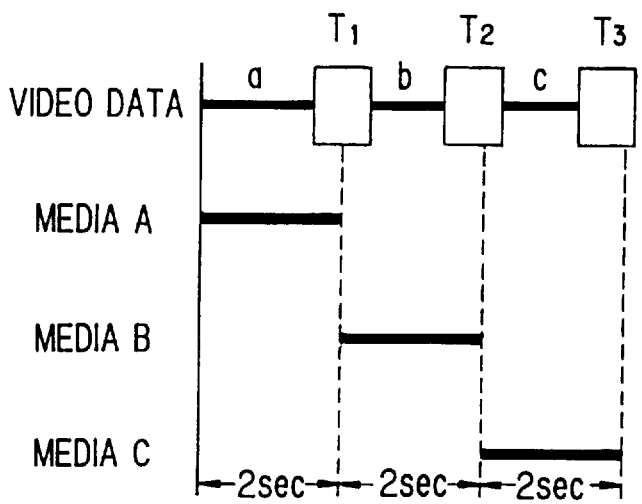
FIG. 13 is a timing chart illustrating an example of timings designated by start and end time parameters.

FIG. 13 is a timing chart illustrating an example of timings designated by start time parameters and end time parameters of media data in a scene described in the initial information table 2.

In the example of FIG. 13, video data 'a', 'b' and 'c' of two seconds having a size of 160×120 pixels and 30 frames par second are designated to be presented synchronized at timings $T_1$, $T_2$ and $T_3$ with media A, B and C respectively by parameters in the initial information table 2.

However, it may occur that reproduction time of the video data is prolonged because of a size correction to 320×240 pixels, for example, and can not be synchronized with other media data. For such case, two kinds of means, that is, means for reducing frame number per second of the video data to be reproduced and means for putting off the start time of other media data to be synchronized with the video data are prepared in the time description correcting section 16. Parameters revised by either or both of the two kinds of means are stored in the RAM 11.

Figure 14:
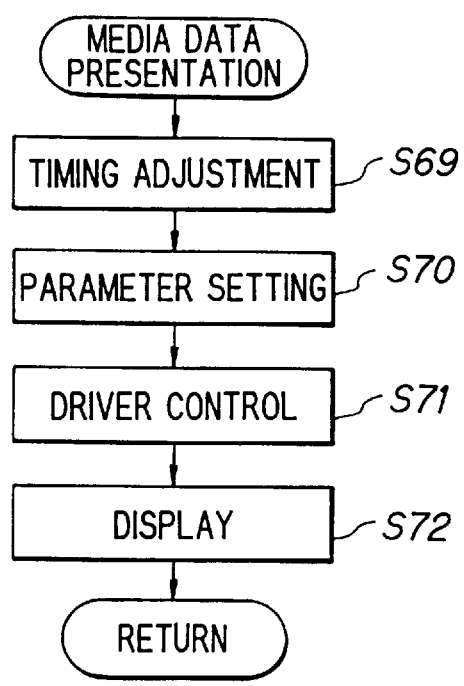
FIG. 14 is a flowchart illustrating control in S10 of FIG. 5 in the media presentation processing section 14.
Figure 15:
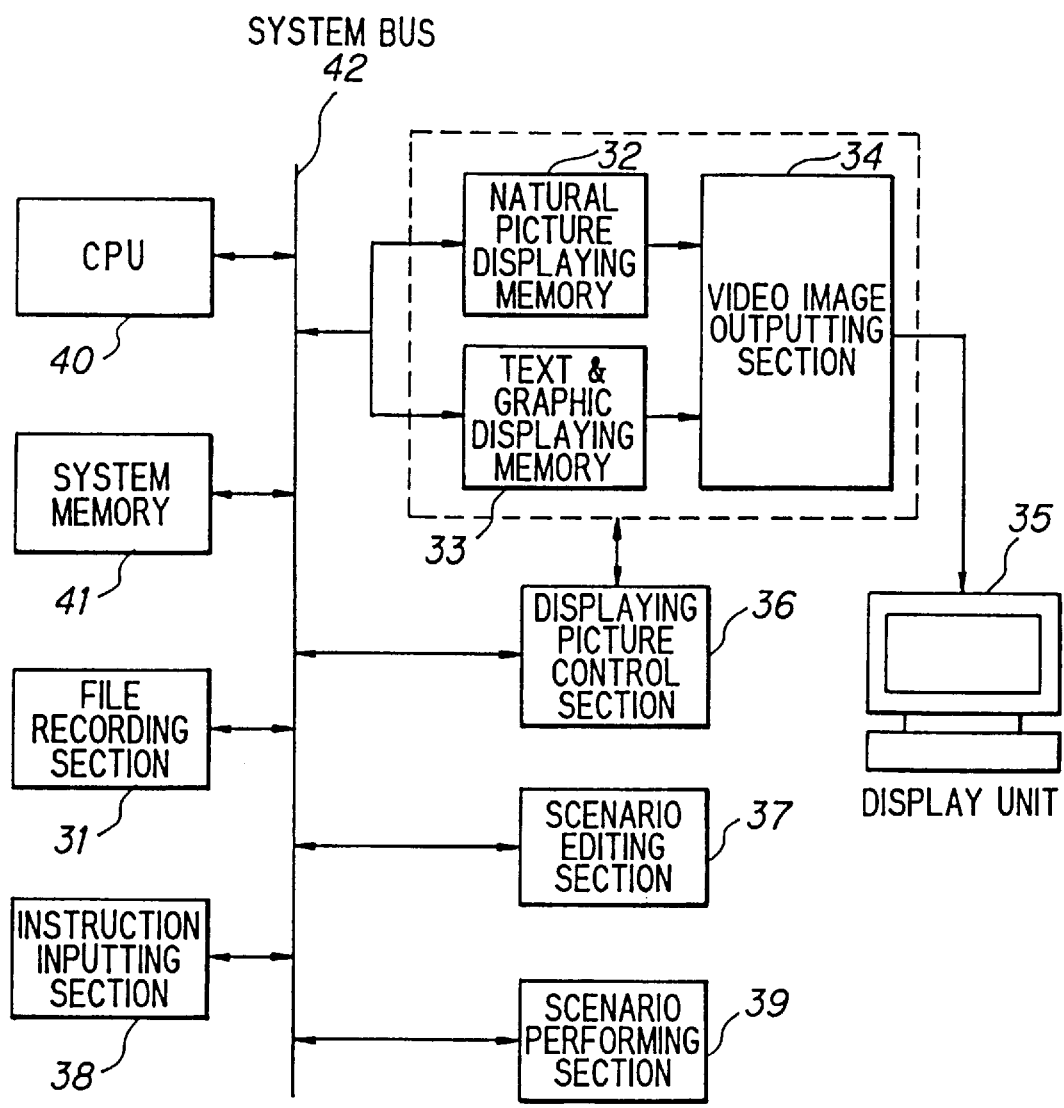
FIG. 15 is a block diagram showing a constitution of a conventional presentation system.
Figure 16:
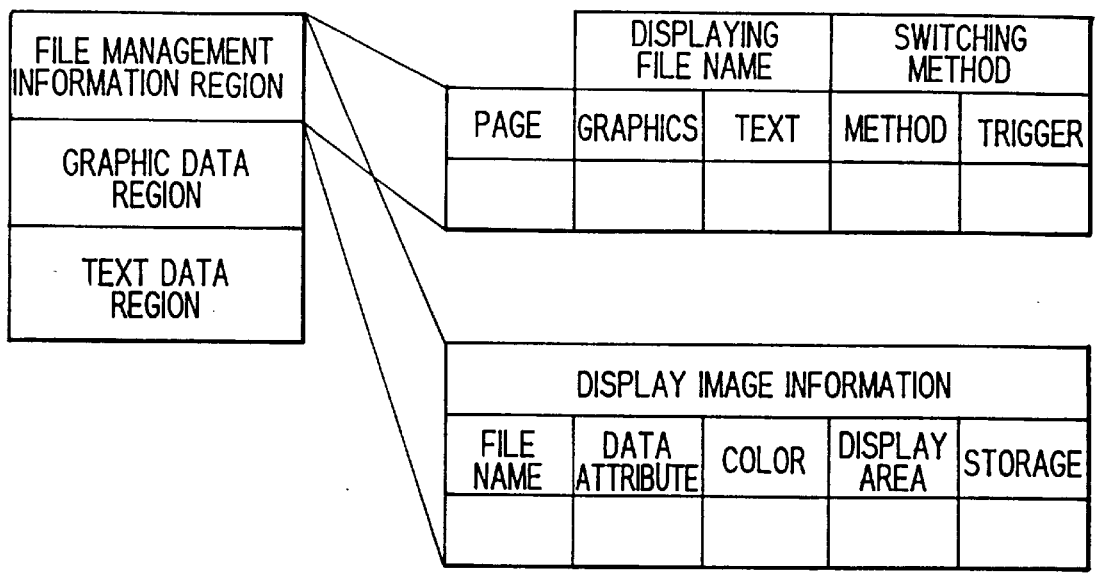
FIG. 16 illustrates a format of scenario data in the conventional presentation system.

Now, operation for media data presentation in S10 of FIG. 5 in the media presentation processing section 14 of FIG. 1 is described referring to a flowchart of FIG. 14.

At a timing adjusted in S69 according to the start time corrected by the time description correcting section 16, media data are delivered to the media presentation processing section 14 in S70 together with the layout parameters thus corrected. The media presentation processing section 14 controls the driver 17 in S71 for displaying the media data in S72. The media presentation processing section 14 has library modules for controlling the kinds of drivers, to take into account change of the driver 17 because of an additional device or a change of device.

As heretofore described, an effective presentation system for presenting various kinds of media data, as video pictures, still pictures, audio data, text data, graphic data or the like simultaneously on a display device of any resolution, is materialized in the present invention, by comprising a layout correcting section for correcting sizes and positions of display images of media data to be presented according to resolution of the display device, and time description correcting section for correcting a reproduction time error caused by size correction of the media data.

What is claimed is:

1. A presentation system having a file recording section for recording a variety of media data for presentation and scenario description file specifying a presentation procedure of a manuscript for presentation, a text RAM and a graphic RAM for storing temporarily display media data designated by said scenario description file among said variety of media data for displaying on a display device for presentation, a scenario editing section for preparing said scenario description file and controlling screen display of said display media data, an instruction inputting section for inputting instructions for preparing said scenario description file and reproducing a presentation, and a scenario performing section for controlling reproduction of said presentation according to said scenario description file and said instructions; comprising:

a layout correcting section controlled by said scenario performing section for correcting positional information and sizes of display images of said display media data according to the resolution of said display device for presentation, said positional information and said sizes being prepared and described in said scenario description file according to the resolution of a display device employed for preparing said scenario description file.

2. A presentation system recited in claim 1, further comprising a font preparing section controlled by said scenario performing section for correcting character sizes and character thicknesses to be displayed on said display device for presentation according to resolution of said display device for presentation, said character sizes and said character thicknesses being prepared according to resolution of said display device employed for preparing said scenario description file.

3. A presentation system recited in claim 1, further comprising a time description correcting section controlled by said scenario performing section for correcting a reproduction time error of said display media data caused by correcting said positional information and said sizes of display images of said display media data.

4. A presentation system recited in claim 1, further comprising a media presentation processing section controlled by said scenario performing section for outputting said display media data together with information for controlling screen display of said display media data to said display device for presentation.

\* \* \* \* \*